US012592447B2

(12) United States Patent
Boddakayala et al.

(10) Patent No.: US 12,592,447 B2
(45) Date of Patent: Mar. 31, 2026

(54) PARTITIONED TRACTION BATTERY PACK AND BATTERY PACK PARTITIONING METHOD

(71) Applicant: Ford Global Technologies, LLC, Dearborn, MI (US)

(72) Inventors: Bhaskara Rao Boddakayala, Troy, MI (US); Parikshit S. Gupte, West Bloomfield, MI (US); Giriraj Srinivasan, Troy, MI (US); Dominic Mario Bertolini, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 18/357,606

(22) Filed: Jul. 24, 2023

(65) Prior Publication Data

US 2025/0038343 A1 Jan. 30, 2025

(51) Int. Cl.
*H01M 50/30* (2021.01)
*B60L 50/64* (2019.01)
*F16J 15/06* (2006.01)
*H01M 50/209* (2021.01)
*H01M 50/24* (2021.01)
*H01M 50/271* (2021.01)
*H01M 50/291* (2021.01)

(52) U.S. Cl.
CPC ............. *H01M 50/30* (2021.01); *B60L 50/64* (2019.02); *F16J 15/067* (2013.01); *H01M 50/209* (2021.01); *H01M 50/24* (2021.01);

*H01M 50/271* (2021.01); *H01M 50/291* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 11,239,520 B2 | 2/2022 | Gupta et al. | |
| 2023/0268581 A1* | 8/2023 | Rhee ................... | H01M 50/293 |

FOREIGN PATENT DOCUMENTS

| | | |
|---|---|---|
| KR | 20220105652 A | 7/2022 |
| WO | 2022024076 A1 | 2/2022 |
| WO | 2023279089 A2 | 1/2023 |

* cited by examiner

*Primary Examiner* — Eli S Mekhlin
(74) *Attorney, Agent, or Firm* — David B. Kelley; Carlson, Gaskey & Olds, P.C.

(57) ABSTRACT

An traction battery pack assemblies includes enclosure assembly providing an interior area. At least one cell stack having a plurality of battery cell groups disposed along a cell stack axis is within the interior area. The at least one cell stack includes a plurality of dividers disposed along the cell stack axis. Each of the divider assemblies is disposed axially between a first and a second battery cell group within the plurality of battery cell groups. A seal is associated with each of the dividers within the plurality of the dividers. The seal seals an interface between the respective divider and the enclosure assembly. The seal can be a bulb seal.

13 Claims, 3 Drawing Sheets

PARTITIONED TRACTION BATTERY PACK AND BATTERY PACK PARTITIONING METHOD

TECHNICAL FIELD

This disclosure relates generally to partitioning areas of a traction battery pack to facilitate venting battery cells of the traction battery pack.

BACKGROUND

A traction battery pack of an electrified vehicle can include groups of battery cells arranged in one or more cell stacks. From time to time, pressure and thermal energy within one or more of the battery cells can increase. In response, gases and debris can be released from those battery cells.

SUMMARY

In some aspects, the techniques described herein relate to a traction battery pack assembly, including: an enclosure assembly that provides an interior area; at least one cell stack having a plurality of battery cell groups disposed along a cell stack axis; a plurality of dividers disposed along the cell stack axis, each of the divider assemblies within the plurality of divider assemblies disposed axially between a first and a second battery cell group within the plurality of battery cell groups; and a seal associated with each of the dividers within the plurality of the dividers, the seal sealing an interface between the respective divider and the enclosure assembly.

In some aspects, the techniques described herein relate to a traction battery pack assembly, wherein the plurality of battery cell groups each include more than one battery cell.

In some aspects, the techniques described herein relate to a traction battery pack assembly, wherein the seal is a bulb seal.

In some aspects, the techniques described herein relate to a traction battery pack assembly, wherein the seal is an intumescent endo-thermic doped silicon material.

In some aspects, the techniques described herein relate to a traction battery pack assembly, wherein the seal includes a groove that receives a portion of the divider.

In some aspects, the techniques described herein relate to a traction battery pack assembly, wherein the seal includes a first leg and a second leg that is spaced from the first leg, the first leg and the second leg defining the groove, the first leg sandwiched along the cell stack axis between the first battery cell group and the divider associated with that seal, the second leg sandwiched along the cell stack axis between the second battery cell group and the divider associated with that seal.

In some aspects, the techniques described herein relate to a traction battery pack assembly, wherein the seal is attached to the associated divider with an interference fit.

In some aspects, the techniques described herein relate to a traction battery pack assembly, wherein the seal is attached to the divider with an adhesive.

In some aspects, the techniques described herein relate to a traction battery pack assembly, wherein the enclosure assembly includes an enclosure cover, wherein the seal associated with each of the dividers seals an interface between the divider and an underside of the enclosure cover.

In some aspects, the techniques described herein relate to a traction battery pack assembly, wherein each divider within the plurality of dividers separates the first group of battery cells from the second group of battery cells.

In some aspects, the techniques described herein relate to a traction battery pack assembly, wherein the seal is attached to at least a vertically upper side of the divider.

In some aspects, the techniques described herein relate to a traction battery pack assembly, wherein the seal is attached to a vertically upper side of the divider and additionally attached to a laterally facing side of the divider.

In some aspects, the techniques described herein relate to a traction battery pack assembly, wherein the seal is configured to block vent byproducts expelled from the first group of battery cells from moving adjacent to the second group of battery cells.

In some aspects, the techniques described herein relate to a traction battery pack assembly, wherein the seal is compressed by the enclosure.

In some aspects, the techniques described herein relate to a method of partitioning a battery pack, including: within an enclosure assembly, compressing a seal between a portion of the enclosure assembly and a divider within a cell stack to block vent byproducts expelled from at least one first battery cell group within the cell stack from flowing adjacent to at least one second battery cell group within the cell stack, the seal secured to the divider.

In some aspects, the techniques described herein relate to a method, wherein the divider is disposed between the at least one first battery cell group and the at least one second battery cell group along a cell stack axis of the cell stack.

In some aspects, the techniques described herein relate to a method, wherein the seal is a bulb seal.

In some aspects, the techniques described herein relate to a method, further including sandwiching a first leg of the seal along an axis of the cell stack between a first side of the divider and the first battery cell group, and sandwiching a second leg of the seal along the axis between an opposite, second side of the divider and the second battery cell group.

In some aspects, the techniques described herein relate to a method, wherein the seal includes a groove that receives a portion of the barrier.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary methods and systems of partitioning interior areas of a traction battery pack. Partitioning can help to contain and direct gas and debris vented from one or more battery cells during a thermal event. Guiding the vented gas and debris away from other battery cells—other battery cells that are not venting—can help to prevent the thermal event from cascading to those other battery cells.

Figures 1, 2:
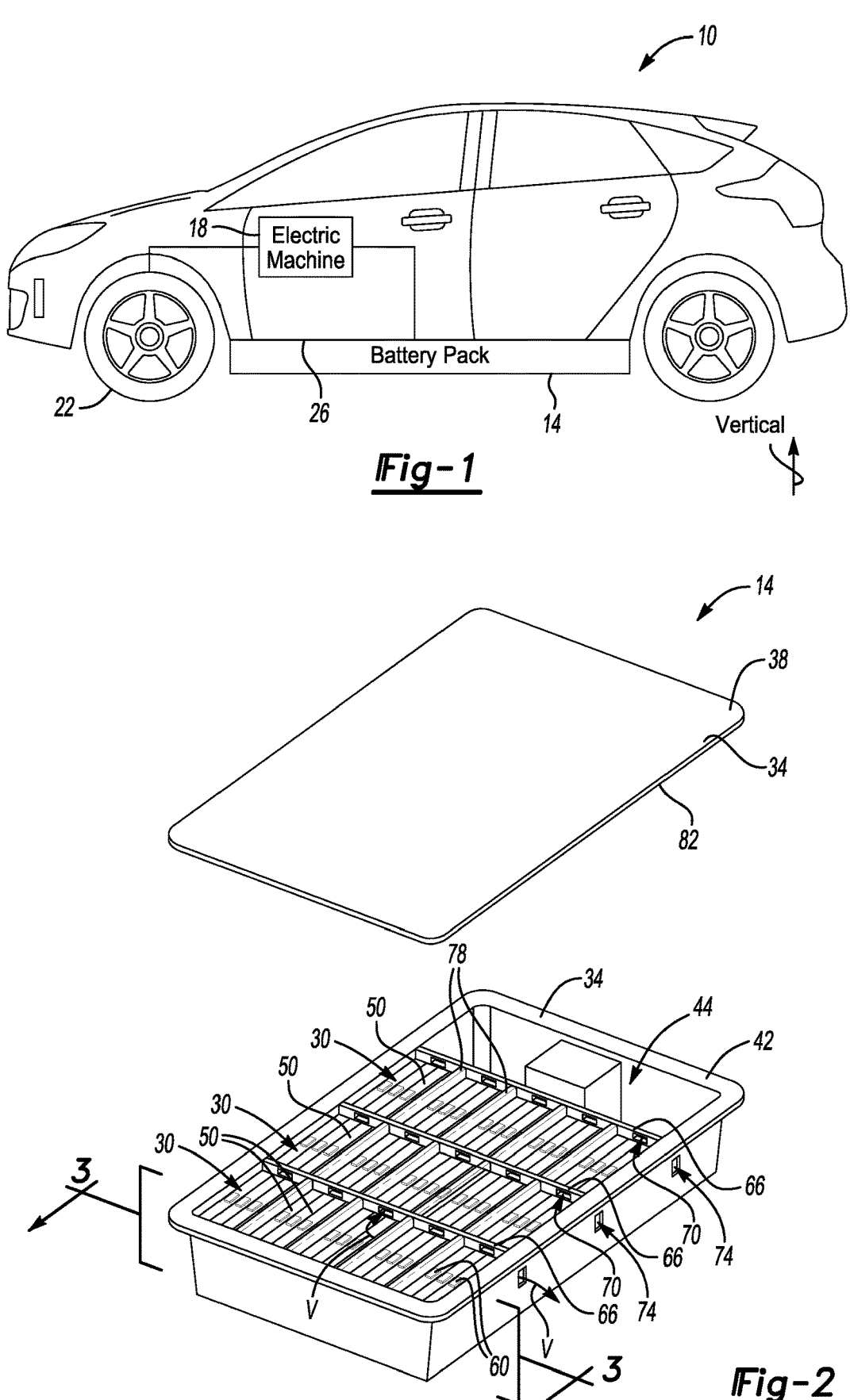
FIG. 1 illustrates a side view of an example electrified vehicle.
FIG. 2 illustrates an expanded, perspective view of a battery pack from the electrified vehicle of FIG. 1 and schematically showing cell stacks of the battery pack.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

Figures 3, 3A:
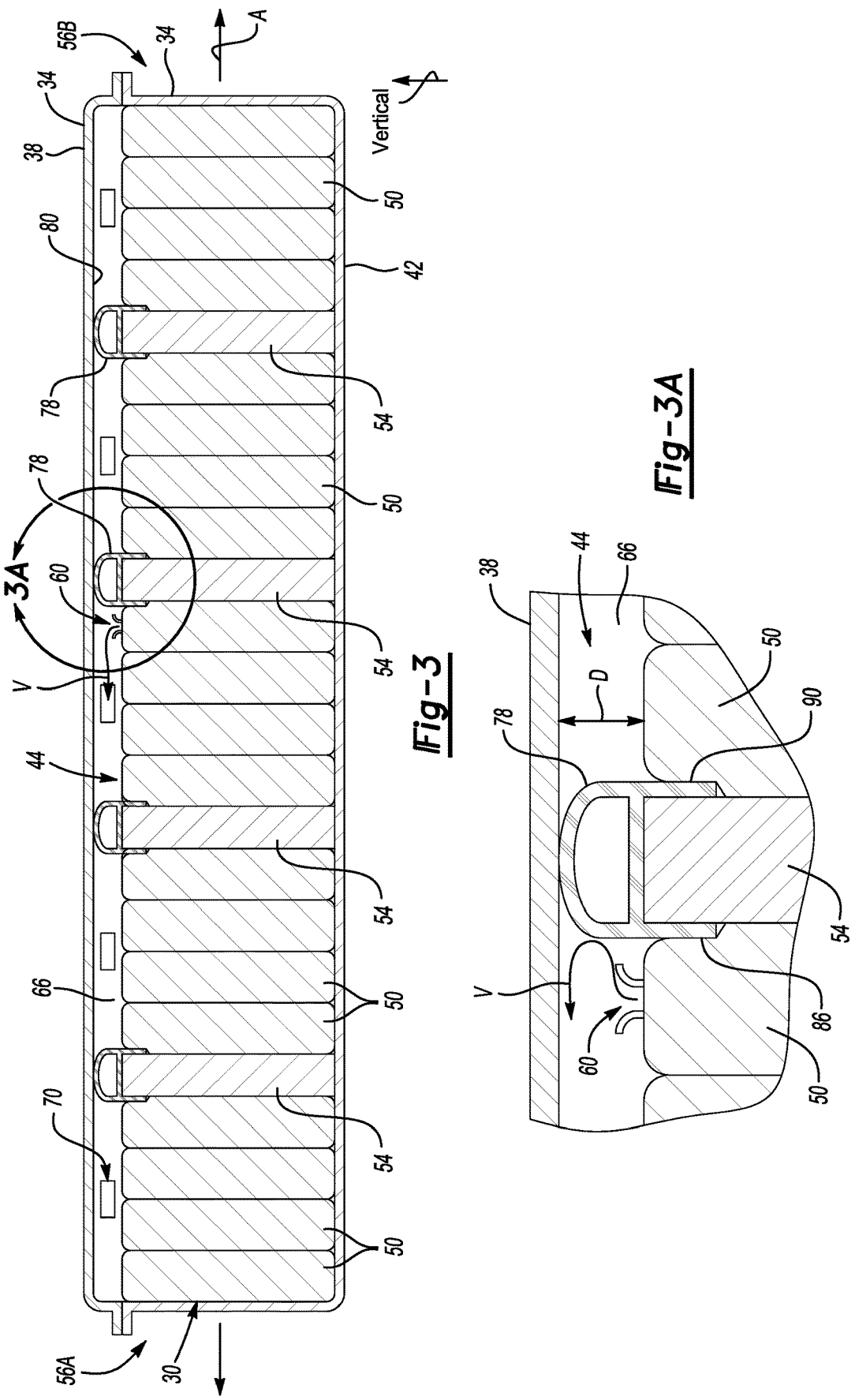
FIG. 3 illustrates a section view taken at line 3-3 in FIG. 2.
FIG. 3A illustrates a close-up of an area of FIG. 3.
Figure 4:
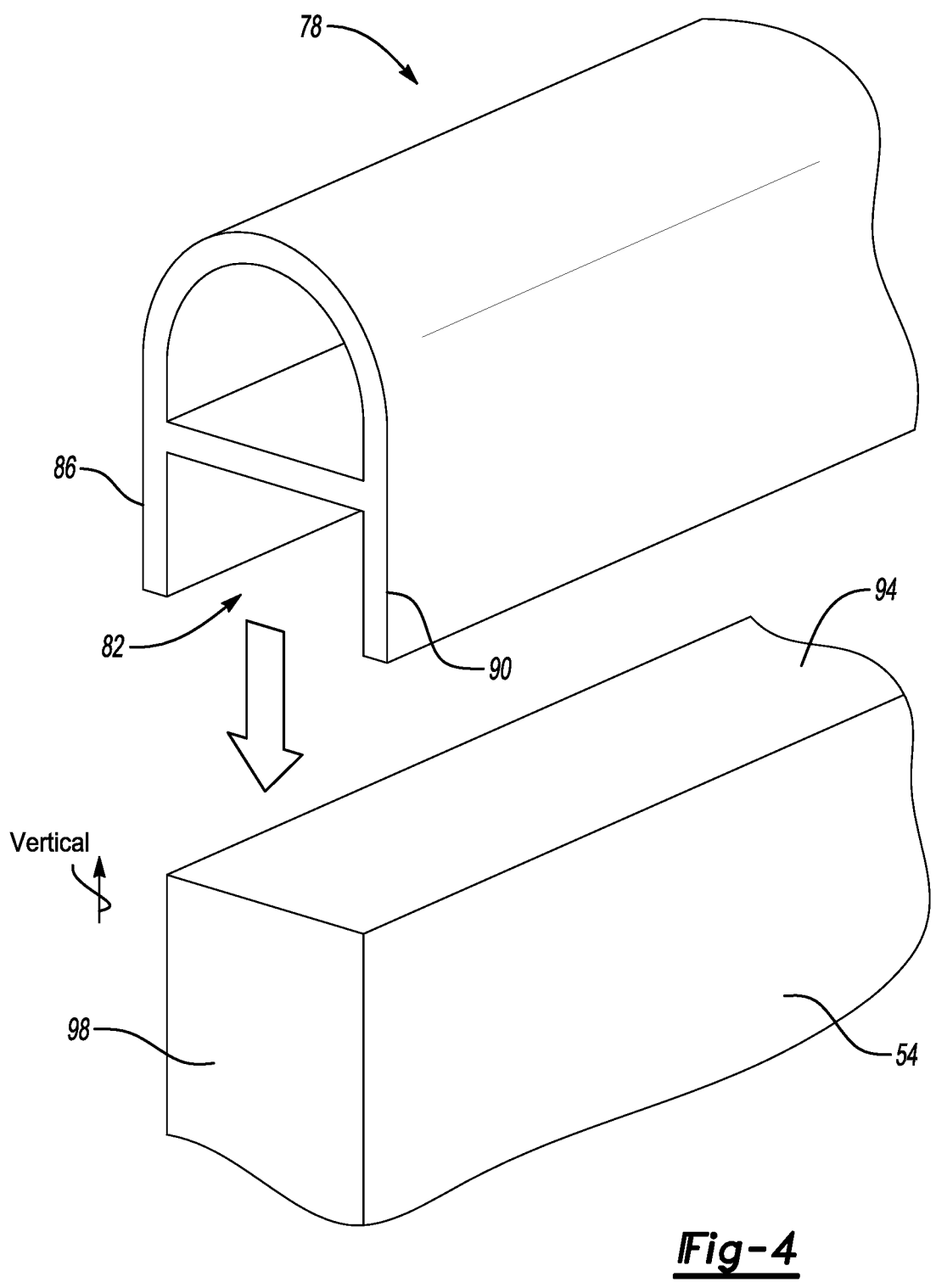
FIG. 4 illustrates a perspective view of a portion of a seal being installed on a portion of a divider for use in the battery pack of FIG. 2.

With reference now to FIGS. 2-4, the battery pack 14 includes a plurality of cell stacks 30 held within an interior of an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the cell stacks 30. The enclosure cover 38 can be secured to the enclosure tray 42 using mechanical fasteners (not shown), for example.

Each of the cell stacks 30 includes a plurality of battery cells 50 (or simply, "cells") and a plurality of dividers 54 disposed along a respective cell stack axis A. The cell stacks 30 each extend from a first axial end 56A to an opposite, second axial end 56B.

Within each cell stack 30, the battery cells 50 are stacked side-by-side relative to each other along the cell stack axis A. The battery cells 50 are arranged in groups that are separated from each other along the axis A by one of the dividers 54. In this example, the dividers 54 are mica sheets. In other examples, the dividers 54 could be an aerogel sheets, or a sheet having some other thermally insulative material or combination of thermally insulative materials.

The battery cells 50 store and supply electrical power. Although specific numbers of the cell stacks 30 and cells 50 are illustrated in the various figures of this disclosure, the battery pack 14 could include any number of the cell stacks 30 having any number of individual cells 50. The groups of battery cells 50 each include four battery cells in this example. In other examples, the groups of battery cells 50 include more than four battery cells or less than four battery cells. The groups of battery cells 50 could include one battery cell in some examples.

In an embodiment, the battery cells 50 are lithium-ion pouch cells. However, battery cells having other geometries (cylindrical, prismatic, etc.) other chemistries (nickel-metal hydride, lead-acid, etc.), or both could alternatively be utilized within the scope of this disclosure.

From time to time, pressure and thermal energy within one or more of the battery cells 50 can increase. The pressure and thermal energy increase can be due to an overcharge condition, for example. The pressure and thermal energy increase can cause the associated battery cell 50 to rupture and expel vent byproducts, such as gas and debris, from within the battery cell 50.

The vent byproducts can be released from the associated battery cell 50 through a designated vent 60 within the housing, such as a membrane that yields in response to increased pressure, or through a ruptured area of the associated battery cell 50.

The battery pack 14, in these examples, includes cross-member assemblies 66 disposed between cell stacks 30. The example cross-member assemblies 66 extend longitudinally in a direction that is parallel to the cell stack axes A. The cross-member assemblies 66 and the cell stack axes A extend in a cross-vehicle direction (i.e., from a driver side to a passenger side).

In this example, the cross-member assemblies 66 include venting passageways and openings 70 to the venting passageways. Vent byproducts vented through the vent 60 of one or more of the battery cells 50 can move through at least one of the openings 70 into venting passageway. The gas and debris are communicated though the venting passageway through an enclosure vent 74 to an area outside the battery pack 14. The openings 70, the enclosure vent 74, or both can be covered by respective membranes, for example, when venting is not needed. During venting, the vent byproducts can rupture the membranes so that the vent byproducts can flow from the battery 50, through the openings 70 to the venting passageway and then through the enclosure vent 74.

To help direct the gas and debris outward for the cell stack axis A though the openings 70 rather than along the axis adjacent to other battery cells 50, seals 78 are secured to each of the dividers 54. The seals 78 are compressed between the enclosure assembly 34—here an underside 80 of the enclosure cover 38—and a vertically upper side of the dividers 54 when the battery pack 14 is assembled. Vertical and horizontal, for purposes of this disclosure, are with reference to ground and an orientation of the vehicle 10 during ordinary operation.

The seals 78 seal an interface between the respective divider 54 and the enclosure assembly 34. This blocks vent byproducts from moving along the cell stack axis A from the battery cells 50 on one side of the divider 54 to the battery cells 50 on an opposite, second side of the divider 54. The vent byproducts are instead directed outward away from the cell stack axis A into the openings 70 in the cross-member assemblies 66.

The seals 78 are bulb seals in this example. The seals 78 can be an intumescent endo-thermic doped silicon material.

The seals 78 include a groove 82 defined between a first leg 86 that is spaced from a second leg 90. The groove 82 receives a portion of the divider 54 when installed on the divider 54. The seal 78 can be secured to the respective divider 54 with an interference fit. In another example, an adhesive can instead or additionally be used to secure the seal 78 to the respective divider 54.

When the divider 54 and seal 78 are positioned within the cell stack 30, the first leg 86 is sandwiched along the cell stack axis A between a first group of battery cells 50 and the divider 54. The second leg 90 is sandwiched along the cell stack axis A between a second group of battery cells 50 and the divider 54.

In this example, the seals 78 are attached to the vertically upper side 94 of the respective divider 54. In another example, the seals 78 could be additionally attached to a laterally facing side 98 of the divider 54.

Due to the seals 78, when one or more of the battery cells 50 vent, the vent byproducts V contact the seals 78 and are redirected so that the vent byproducts V flow through the openings 70 in the cross-member assemblies 66 rather than adjacent to other battery cells 50 in the cell stack 30. Vent byproducts V flowing adjacent to other battery cells 50 can increase thermal energy levels in those battery cells 50 and lead to a cascading thermal event.

In this example, the dividers 54 and the seals 78 separate groups of four battery cells 50 within a given one of the cell stacks 30 from other groups of four battery cells 50 within that cell stack 30. Thus, vent products V from a venting battery cell 50 flow adjacent to, at most, three other battery cells 50 within that group before moving through the openings 70.

In this example, the seals 78 are compressed when the enclosure cover 38 is secured to the enclosure tray 42. Even if pressure associated with a venting event causes the enclosure cover 38 to move slightly away from the enclosure tray 42, the seals 78 can decompress and maintain contact with the underside of the enclosure cover 38 to maintain the partitioning.

In an example, the first leg 86 and the second leg 90 are about 3.5 millimeters long and about 1.5 millimeters thick. The groove 82 or spacing between the first leg 86 and the second leg 90 is about 4.4 millimeters.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:
an enclosure assembly that provides an interior area;
at least one cell stack within the interior area, the at least one cell stack having a plurality of battery cell groups disposed along a cell stack axis;
a plurality of dividers disposed along the cell stack axis, each of the dividers within the plurality of dividers disposed axially between a first and a second battery cell group within the plurality of battery cell groups; and
a seal associated with each of the dividers within the plurality of the dividers, the seal sealing an interface between a respective divider and the enclosure assembly, wherein the seal is a bulb seal.

2. The traction battery pack assembly of claim 1, wherein the plurality of battery cell groups each include more than one battery cell.

3. The traction battery pack assembly of claim 1, wherein the seal is an intumescent endo-thermic doped silicon material.

4. The traction battery pack assembly of claim 1, wherein the seal includes a groove that receives a portion of the divider.

5. The traction battery pack assembly of claim 4, wherein the seal includes a first leg and a second leg that is spaced from the first leg, the first leg and the second leg defining the groove, the first leg sandwiched along the cell stack axis between the first battery cell group and the divider associated with that seal, the second leg sandwiched along the cell stack axis between the second battery cell group and the divider associated with that seal.

6. The traction battery pack assembly of claim 1, wherein the seal is attached to the associated divider with an interference fit.

7. The traction battery pack assembly of claim 1, wherein the seal is attached to the divider with an adhesive.

8. The traction battery pack assembly of claim 1, wherein the enclosure assembly includes an enclosure cover, wherein the seal associated with each of the dividers seals an interface between the divider and an underside of the enclosure cover.

9. The traction battery pack assembly of claim 1, wherein each divider within the plurality of dividers separates the first group of battery cells from the second group of battery cells.

10. The traction battery pack assembly of claim 1, wherein the seal is attached to at least a vertically upper side of the divider.

11. The traction battery pack assembly of claim 1, wherein the seal is attached to a vertically upper side of the divider and additionally attached to a laterally facing side of the divider.

12. The traction battery pack assembly of claim 1, wherein the seal is configured to block vent byproducts expelled from the first group of battery cells from moving adjacent to the second group of battery cells.

13. The traction battery pack assembly of claim 1, wherein the seal is compressed by the enclosure.

* * * * *